United States Patent
Hollnagle

[11] Patent Number: 5,806,898
[45] Date of Patent: Sep. 15, 1998

[54] TUBE QUICK CONNECT COUPLING

[76] Inventor: Harold E. Hollnagle, 9479 N. Riverbend Ct., Wilwaukee, Wis. 53217

[21] Appl. No.: 754,638

[22] Filed: Nov. 21, 1996

[51] Int. Cl.$^6$ .................................................... F16L 37/08
[52] U.S. Cl. ............................ 285/86; 285/319; 285/921
[58] Field of Search ................................ 285/39, 81, 921, 285/319, 84, 85, 86

[56] References Cited

U.S. PATENT DOCUMENTS

| | | |
|---|---|---|
| 921,691 | 5/1909 | Friday . |
| 2,336,656 | 12/1943 | Van Uum . |
| 3,215,455 | 11/1965 | Fiala et al. ............................... 285/233 |
| 3,711,125 | 1/1973 | Dehar . |
| 3,826,523 | 7/1974 | Eschbaugh . |
| 4,266,814 | 5/1981 | Gallagher . |
| 4,270,777 | 6/1981 | Fisher . |
| 4,541,658 | 9/1985 | Bartholomew . |
| 4,681,351 | 7/1987 | Bartholomew . |
| 4,697,832 | 10/1987 | Dickirson . |
| 4,778,203 | 10/1988 | Bartholomew . |
| 4,802,697 | 2/1989 | Bartholomew . |
| 4,915,420 | 4/1990 | Washizu . |
| 4,925,217 | 5/1990 | Ketcham . |
| 4,948,176 | 8/1990 | Bartholomew . |
| 4,979,765 | 12/1990 | Bartholomew ....................... 285/319 X |
| 5,002,315 | 3/1991 | Bartholomew . |
| 5,067,754 | 11/1991 | Bartholomew . |
| 5,069,489 | 12/1991 | Bartholomew . |
| 5,195,787 | 3/1993 | Bartholomew . |
| 5,324,082 | 6/1994 | McNaughton et al. . |
| 5,330,235 | 7/1994 | Wagner et al. ............................ 285/81 |

*Primary Examiner*—Randolph A. Reese
*Assistant Examiner*—Gary Grafel
*Attorney, Agent, or Firm*—Howard & Howard

[57] ABSTRACT

A quick disconnect member (36, 136) is retained on a tube (12) for sliding movement therealong to react with the projection (18) and includes a pair of arms (42) each with a V-shaped abutment (38) biased radially outwardly into a locked position in overlapping engagement with a shoulder (28) to prevent removal of the tube (12) from the socket. A resilient safety plug (44) is disposed between the tube (12) and the abutment (38) for preventing abutment (38) from disengaging from the shoulder (28). The safety plug (44) retains hooks (43) radially outwardly against the lip (32). The safety plug (44) presents an annular ridge (46) extending into the V-shaped abutment (38) to retain the safety plug (44) in the socket member (14) and a radially extending flange (48) abutting the distal ends of the arms (42).

26 Claims, 2 Drawing Sheets

TUBE QUICK CONNECT COUPLING

TECHNICAL FIELD

The subject invention relates to a quick connect assembly of the type for connecting a fluid conveying tube into a female socket located in a member in fluid.

BACKGROUND OF THE INVENTION

The art of coupling or connecting a fluid tube to a female socket or receptacle is highly developed and therefore includes a wide variety of assemblies. There is, however, a constant need to simplify the assembly and the manufacturing time and expense. Snap together assemblies which are manually released or disconnected are well known. Examples of such assemblies are disclosed in U.S. Pat. Nos. 3,826,523 to Eschbaugh and 5,324,082 to McNaughton et al. Many of the prior assemblies would allow inadvertent decoupling. This requirement plus a need for simplicity in design and ease of manufacture leaves opportunity for yet greater simplicity while meeting these requirements.

SUMMARY OF THE INVENTION AND ADVANTAGES

A coupling assembly for connecting a tube to a socket comprising a socket member defining a female socket with a tube having an end disposed in the socket and presenting a radially extending projection. The socket member presents a radially extending shoulder. A quick disconnect member is retained on the tube for sliding movement therealong to react with the projection and includes an abutment biased radially outwardly into a locked position in overlapping engagement with the shoulder to prevent removal of the tube from the socket. The assembly is characterized by a safety lock disposed between the tube and the abutment for preventing the abutment from disengaging from the shoulder.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
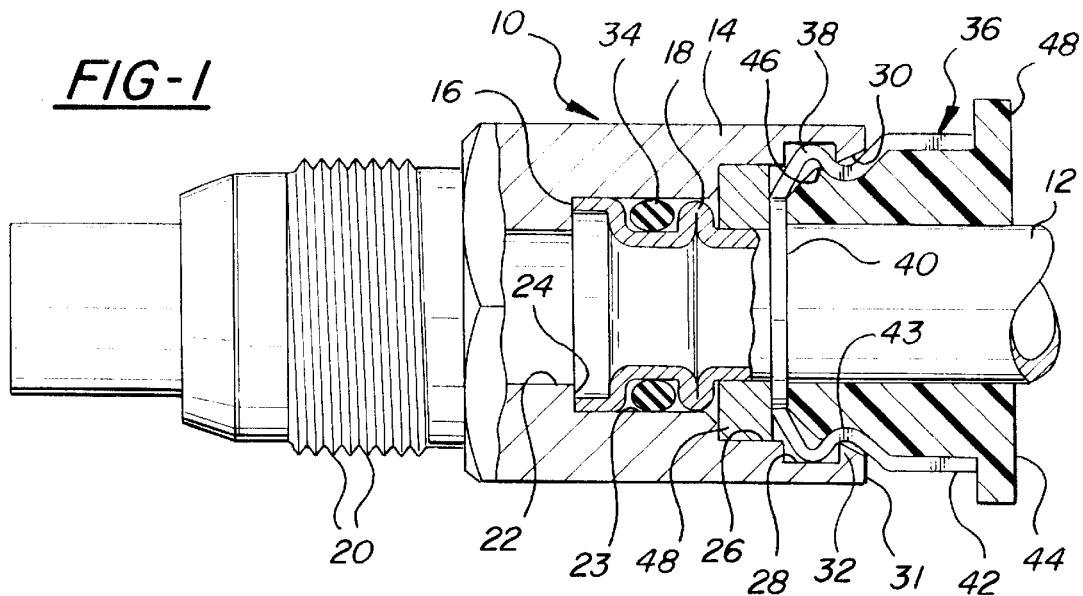
FIG. 1 is a cross sectional view of a first embodiment of the invention.

Referring to the Figures, wherein like numerals indicate like or corresponding parts throughout the several views, a coupling assembly is generally shown at 10. The coupling assembly 10 is useful for connecting a tube 12 to a socket member 14 defining a female socket.

The tube 12 has an end 16 disposed in the socket member 14 and presents a radially extending tube projection 18. The projection 18 is defined by a crimp or gathering in the tube 12 and which extends annularly about the axis of the tube 12.

The socket member 14 has external threads 20 for threadedly engaging a structure to be in fluid communication with an internal passage 22 and the tube 12. The socket member 14 also includes a tube counterbore 23 presenting a radial tube seat 24 and the end 16 of the tube 12 is seated against the tube seat 24. The socket member 14 further includes an entry counterbore 26. The entry counterbore 26 presents a radially extending shoulder 32 defined by an annular groove 28 in the entry counterbore 26 of the socket member 14. Although the shoulder 32 is defined by an annular groove 28 in the socket, it could be defined by a snap ring retained in the socket member 14. A conical surface 30 extends between the front face or end 31 of the socket member 14 and the shoulder 32 of the groove 28. The socket member 14 therefore presents an annular lip defined by the shoulder 32 between the end 31 and the groove 28. Another conical surface extends between the tube counterbore 23 and the entry counterbore 26. The projection 18 is radially smaller than the tube counterbore 23 for allowing the projection 18 to move into the tube counterbore 23.

The end 16 of the tube 12 is enlarged to a degree equal to the projection 18 to define a seal saddle therebetween. One or more O-ring seals 34 are disposed in the seal saddle snugly between the projection 18 and the enlarged end 16. The seals 34, therefore, extend annularly about the tube 14 between the projection 18 and the end 16 of the tube 12 for sealing the tube 12 in the socket.

A quick disconnect member is generally indicated at 36, 136. The quick disconnect member 36, 136 is retained on the tube 12 for sliding movement therealong to abut or react with the projection 18 and includes an abutment 38 biased radially outwardly into a locked position in overlapping engagement with the shoulder 28 to prevent removal of the tube 12 from the socket. The quick disconnect member 36, 136 includes a support portion 40 surrounding the tube 12 and in sliding engagement with the tube 12 to react with the projection 18 and at least one arm 42 extending axially along the tube 12 in a cantilevered fashion from the support portion 40 to a distal end axially displaced from the support portion 40. The abutment 38 is disposed between the support portion 40 and the distal end. Each abutment 38 is V-shaped as viewed in cross section with the apex of the V-shape extending into the groove 28. The abutment 38, therefore, presents an angled surface defining a biasing means for wedging engagement with the shoulder 32 for biasing the support portion 40 toward the projection 18 to urge the end 16 of the tube 12 into the socket member 14. In addition, each arm 42 includes a hook 43 adjacent each of said V-shaped abutments 38, which hook extends around the shoulder 32.

Figure 2:
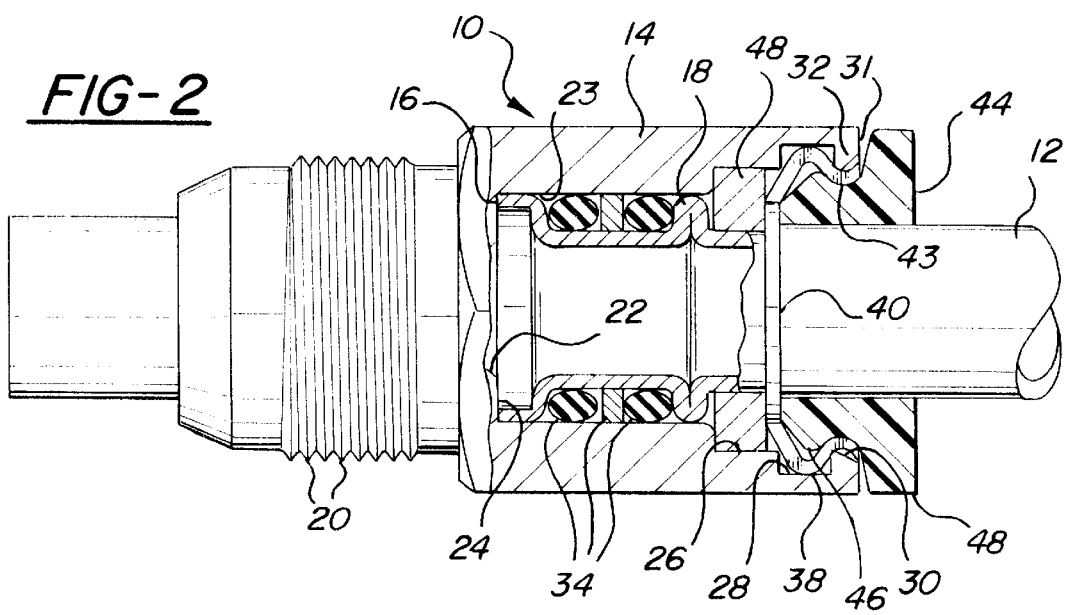
FIG. 2 is a cross sectional view of a second embodiment of the invention.
Figure 3:
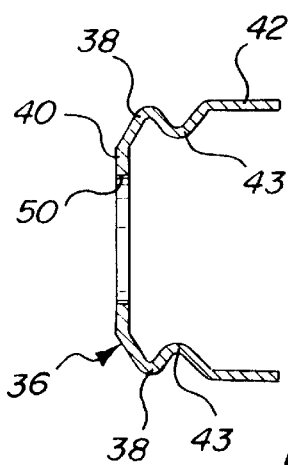
FIG. 3 is a cross sectional view taken along line 4—4 of FIG. 4.
Figure 4:
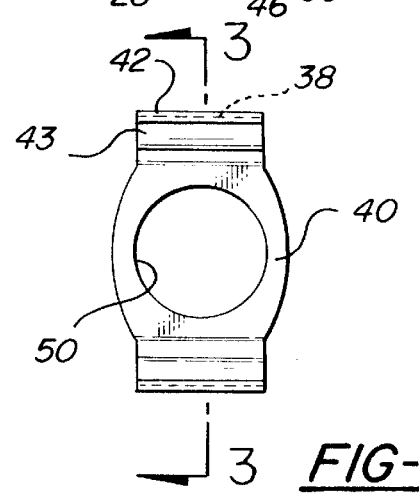
FIG. 4 is an end view of the embodiment of FIG. 1 taken from right to left.
Figure 5:
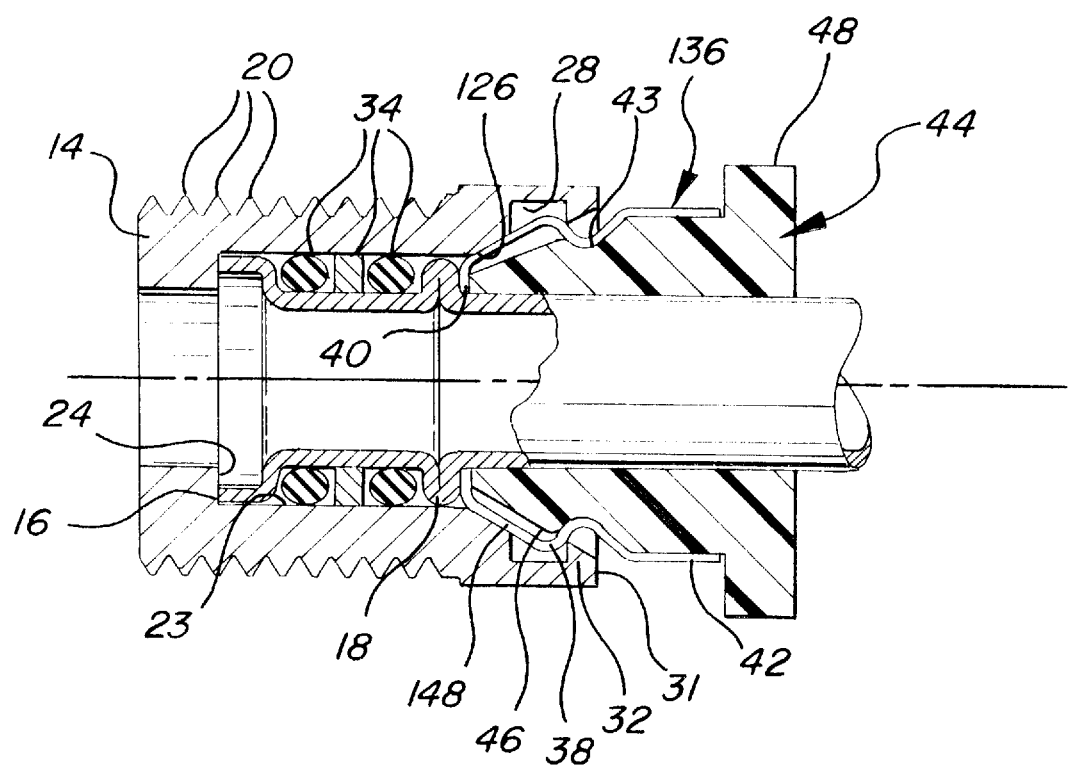
FIG. 5 is a cross sectional view of a third embodiment.

The only difference between the second embodiment of FIG. 2 and the first embodiment of FIG. 1 is that the arms 42 of the second embodiment terminate at the end 31 of the socket member 14 whereas the arms 42 extend out of the end 31 of the socket member 14 in the embodiment of FIG. 1. The difference between the third embodiment of FIG. 5 and the first embodiment of FIG. 1 is that the socket member 14 in FIG. 5 includes a beveled surface 126 extending between the shoulder 28 and the bore 23. To coact with this beveled surface 126, the quick disconnect member 136 includes a tapered nose section 148 extending between the abutment 38 and the support portion 40 for wedging engagement with the beveled surface 126.

Besides the configuration of the quick disconnect member 36, 136, the assembly is characterized by a safety lock or plug 44 disposed between the tube 12 and the abutment 38 for preventing abutment 38 from disengaging from the shoulder 32. The safety lock or plug 44 surrounds the tube 12 and engages the hooks 43 to retain the hooks 43 radially outwardly against the shoulder 32. The safety plug 44 is resilient and presents an annular ridge 46 extending into the V-shaped abutment 38 to retain the safety plug 44 in the socket member 14. The safety plug 44 also includes a radially extending flange 48 abutting the distal ends of the arms 42.

In the embodiment of FIGS. 1 and 2, the support portion 40 of the quick disconnect member 36 reacts with the projection 18 through compression means 48 disposed between the projection 18 of the tube 12 and the support portion 40 for biasing the end 16 of the tube 12 against the tube seat 24. The compression means 48 comprises a spring-like material but could take the form of Belleville washers, or the like.

The quick connect members 36, 136 are defined by sheet metal in a U-shape having a base defining the support portion 40, the base having an opening 50 therein through which the tube 12 extends. The arms 42 are disposed diametrically opposite to one another. The base 40 defines a circular periphery extending between the arms 42 as the base is viewed in plan. The arms 42 are biased by being spring loaded to a neutral position in which the abutments 38 are disposed radially outwardly of the shoulder 32 in the free state so that the support portion 40 may be moved along the tube 12 and into the socket followed by the arms 42 moving radially inwardly toward the tube 12 as the abutments 38 are moved axially into the socket and radially inwardly to clear the shoulder 32 whereupon the arms 42 snap into position to allow the abutments 38 to be biased into the overlapping engagement with the shoulder 32. The distal ends of the arms 42 may be manually grasped or squeezed together to insert and remove the quick disconnect member 36, 136 to and from the engagement of the abutments 38 with the shoulder 32 defined by the groove 28. A tool may also be used to insert and remove the quick disconnect members 36, 136, especially with the short arms 42 of the second embodiment.

In the embodiment of FIG. 1 there is a single seal 34 extending annularly about the tube 12 between the projection 18 and the end 16 of the tube 12 for sealing the tube 12 in the socket whereas the second and third embodiments include a plurality of seals and of different compositions and configurations.

The quick disconnect members 36, 136 include the abutment 38 disposed between the support portion 40 and the distal end and biased radially outwardly by the arms 42 and into a locked position in overlapping engagement with the shoulder 32 to react with the projection 18 of the tube 12 and prevent removal of the tube 12 from the socket. The abutment 38 is V-shaped as viewed in cross section with the apex of the V-shape extending radially outwardly to present an angled surface defining for wedging engagement with the shoulder 32 to urge the end 16 of the tube 12 into the socket member 14. However in the embodiment of FIG. 5, the tapered nose section 148 is also in wedging engagement with the beveled surface 126 to firmly bias the abutment 38 into engagement with the shoulder 32.

The plug 44 is forced into the socket member 14 within the quick disconnect member 36, 136 to prevent the quick disconnect member 36, 136 from being removed. The plug 44 could be in two pieces separated diametrically and serially inserted into the quick disconnect member 36, 136 or a one piece element first disposed on the tube 12 before the tube is upset at the projection 18 or from the other end of the tube 12. The plug 44 could also be resilient enough to stretch over the projection 18. Once the plug 44 is in place, the quick disconnect member 36, 136 is prevented from being removed from the socket member 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A coupling assembly (10) for connecting a tube to a socket, said assembly (10) comprising:

a socket member (14) defining a female socket;

a tube (12) having an end (16) disposed in said socket and presenting a radially extending projection (18);

said socket member (14) presenting a radially extending shoulder (32);

a quick disconnect member (36, 136) retained on said tube (12) for sliding movement into said socket member (14) to react with said projection (18) and including an abutment (38) biased radially outwardly into a locked position in overlapping engagement with said shoulder (32) to prevent removal of said tube (12) from said female socket;

said assembly characterized by a safety lock (44) disposed between said tube (12) and said abutment (38) for preventing said abutment (38) from disengaging from said shoulder (32).

2. An assembly as set forth in claim 1 wherein said quick disconnect member (36, 136) includes a support portion (40) surrounding said tube (12) and in sliding engagement with said tube (12) to react with said projection (18) and at least one arm (42) extending axially along said tube (12) to a distal end axially displaced from said support portion (40), said abutment (38) being disposed between said support portion (40) and said distal end.

3. An assembly as set forth in claim 2 wherein said abutment (38) includes axial biasing means for biasing said support portion (40) toward said projection (18) to urge said end (16) of said tube (12) into said socket member (14).

4. An assembly as set forth in claim 3 wherein said abutment (38) presents an angled surface defining said biasing means for wedging engagement with said shoulder (32) to urge said end (16) of said tube (12) into said socket member (14).

5. An assembly as set forth in claim 2 wherein said shoulder (32) is defined by an annular groove (28) in said socket.

6. An assembly as set forth in claim 5 wherein said abutment (38) is V-shaped as viewed in cross section with the apex of the V-shape extending into said groove.

7. An assembly as set forth in claim 6 including a pair of said arms (42) cantilevered from said support portion (40), each of said arms (42) including a hook (43) adjacent each of said V-shaped abutments and extending around said shoulder (32).

8. An assembly as set forth in claim 7 wherein said safety lock (44) comprises a safety plug surrounding said tube (12) and engaging said hooks (43) to retain said hooks (43) radially outwardly against said shoulder (32).

9. An assembly as set forth in claim 8 wherein said safety plug (44) is resilient and presents an annular ridge (46) extending into said V-shaped abutment to retain said safety plug in said socket member (14).

10. An assembly as set forth in claim 9 wherein said socket member (14) has an end (31) and said arms (42) terminate at said end (31) of said socket member (14).

11. An assembly as set forth in claim 9 wherein said socket member (14) has and end (31) and said arms (42) extend out of said end (31) of said socket member (14).

12. An assembly as set forth in claim 9 wherein said safety plug (44) includes a radially extending flange (48) abutting said distal ends of said arms (42).

13. An assembly as set forth in claim 9 wherein said socket includes a tube counterbore (23) presenting a radial tube seat (24) and said end (16) of said tube (12) is seated against said tube seat (24).

14. An assembly as set forth in claim 13 including compression means (48) disposed between said projection (18) of said tube (12) and said support portion (40) for biasing said end (16) of said tube (12) against said tube seat (24).

15. An assembly as set forth in claim 13 wherein said socket member (14) includes a beveled surface (126) extending between said shoulder (32) and said bore (23), and said quick disconnect member (136) includes a tapered nose section (148) extending between said abutment (38) and said support portion (40) for wedging engagement with said beveled surface (126).

16. An assembly as set forth in claim 13 including a seal (34) extending annularly about said tube (12) between said projection (18) and said end (16) of said tube (12) for sealing said tube (12) in said socket.

17. An assembly as set forth in claim 16 wherein said socket includes an entry counterbore (26) larger than said tube counterbore (23), said annular groove (28) being disposed along said entry counterbore (26), said projection (18) being radially smaller than said tube counterbore (23) for allowing said projection (18) to move into said tube counterbore (23).

18. An assembly as set forth in claim 17 wherein said end (16) of said tube (12) is enlarged to a degree equal to said projection (18) to define a seal saddle therebetween with said seal (34) disposed therein.

19. An assembly as set forth in claim 18 wherein said quick connect member (36, 136) is defined by sheet metal in a U-shape having a base defining said support portion (40), said base having an opening (48) therein through which said tube (12) extends.

20. An assembly as set forth in claim 19 wherein said arms (42) are disposed diametrically opposite to one another.

21. An assembly as set forth in claim 20 wherein said base (40) defines a circular periphery extending between said arms (42) as said base is viewed in plan.

22. An assembly as set forth in claim 21 wherein said arms (42) are biased by being spring loaded to a neutral position in which said abutments (38) are disposed radially outwardly of said shoulder (32) so that said support portion (40) may be moved along said tube (12) and into said socket followed by said arms (42) moving radially inwardly toward the tube (12) as said abutments (38) are moved axially into said socket and radially inwardly to clear said shoulder (32) whereupon said arms (42) snap into position to allow said abutments (38) to be biased into said overlapping engagement with said shoulder (32).

23. A quick disconnect member (36, 136) for connecting a tube (12) presenting a radially extending projection (18) in a female socket presenting a radially extending shoulder (32), said quick disconnect member (36, 136) comprising an annular support portion (40) for surrounding an axis and being retained on the tube (12) to slide therea long and at least one arm (42) extending transversely from said annular support portion (40) for disposition axially along the tube (12) to a distal end displaced axially from said annular support portion (40), an abutment (38) disposed between said support portion (40) and said distal end and biased radially outwardly by said arm (42) and into a locked position in overlapping engagement with the shoulder (32) to react with the projection (18) of the tube (12) and prevent removal of the tube (12) from the socket, said abutment (38) being V-shaped as viewed in cross section with the apex of the V-shape extending radially outwardly to present an angled surface defining for wedging engagement with the shoulder (32) to urge the end (16) of the tube (12) into the socket member (14), a pair of said arms (42) cantilevered from said support portion (40), each of said arms (42) including a hook (43) adjacent each of said V-shaped abutments (38), said quick connect member (36, 136) being defined by sheet metal in a U-shape having a base defining said support portion (40), said base having an opening (48) therein through which the tube (12) extends, said arms including a tapered nose section (148) extending between said abutment (38) and said support portion (40) for wedging engagement with a beveled surface (126).

24. A quick disconnect member (36, 136) for connecting a tube (12) presenting a radially extending projection (18) in a female socket presenting a radially extending shoulder (32), said quick disconnect member (36, 136) comprising an annular support portion (40) for surrounding an axis and being retained on the tube (12) to slide therea long and at least one arm (42) extending transversely from said annular support portion (40) for disposition axially along the tube (12) to a distal end displaced axially from said annular support portion (40), an abutment (38) disposed between said support portion (40) and said distal end and biased radially outwardly by said arm (42) and into a locked position in overlapping engagement with the shoulder (32) to react with the projection (18) of the tube (12) and prevent removal of the tube (12) from the socket, said abutment (38) being V-shaped as viewed in cross section with the apex of the V-shape extending radially outwardly to present an angled surface defining for wedging engagement with the shoulder (32) to urge the end (16) of the tube (12) into the socket member (14), a pair of said arms (42) cantilevered from said support portion (40), each of said arms (42) including a hook (43) adjacent each of said V-shaped abutments (38), and a safety plug (44) for snapping into engagement within said arms (42) for preventing radially inward movement of said abutments (38).

25. An assembly as set forth in claim 24 wherein said safety plug (44) is resilient and presents an annular ridge (46) for extending into said V-shaped abutment (38) to retain said safety plug (44) in the socket member (14).

26. An assembly as set forth in claim 25 wherein said safety plug (44) includes a radially extending flange (48) abutting said distal ends of said arms (42).

* * * * *